(12) United States Patent
Zhu et al.

(10) Patent No.: US 11,316,427 B2
(45) Date of Patent: Apr. 26, 2022

(54) VOLTAGE CONTROL CIRCUIT, CONTROL METHOD THEREOF, AND DISPLAY DEVICE

(71) Applicants: Hefei Xinsheng Optoelectronics Technology Co., Ltd., Anhui (CN); BOE TECHNOLOGY GROUP CO., LTD., Beijing (CN)

(72) Inventors: Lixin Zhu, Beijing (CN); Chunyang Nie, Beijing (CN); Ke Dai, Beijing (CN); Lei Guo, Beijing (CN); Ruilian Li, Beijing (CN); Xueqin Wei, Beijing (CN)

(73) Assignees: Hefei Xinsheng Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 21 days.

(21) Appl. No.: 16/833,855

(22) Filed: Mar. 30, 2020

(65) Prior Publication Data

US 2021/0119534 A1 Apr. 22, 2021

(30) Foreign Application Priority Data

Oct. 22, 2019 (CN) .......................... 201911007083.6

(51) Int. Cl.
*H02M 3/156* (2006.01)
(52) U.S. Cl.
CPC .................................. *H02M 3/156* (2013.01)
(58) Field of Classification Search
None
See application file for complete search history.

(56) References Cited

U.S. PATENT DOCUMENTS 7,274,116 B2* 9/2007 Inoue ................ H02J 7/007182
307/100
8,508,208 B2* 8/2013 Klein .................. H02M 3/1582
323/284

(Continued)

FOREIGN PATENT DOCUMENTS

CN 103165091 A 6/2013
CN 104184319 A 12/2014

(Continued)

OTHER PUBLICATIONS

First Office Action for CN Patent Application No. 201911007083.6 dated Dec. 30, 2021.

*Primary Examiner* — Jeffrey A Gblende
(74) *Attorney, Agent, or Firm* — Thomas | Horstemeyer, LLP

(57) ABSTRACT

A voltage control circuit comprises a sampling sub-circuit and a control sub-circuit. The sampling sub-circuit is configured to detect a potential difference between an output voltage and an input voltage to obtain a first voltage and output the first voltage to the control sub-circuit. The control sub-circuit is configured to compare a magnitude of the first voltage with a first voltage threshold, if the first voltage is less than the first voltage threshold, output the input voltage as the output voltage, and, if the first voltage is greater than or equal to the first voltage threshold, superimpose and output the input voltage and a bootstrap voltage as the output voltage.

16 Claims, 5 Drawing Sheets

(56) References Cited

U.S. PATENT DOCUMENTS

| | | | |
|---|---|---|---|
| 2010/0020053 A1* | 1/2010 | Sah | G09G 3/3685 |
| | | | 345/208 |
| 2010/0134078 A1* | 6/2010 | Murakami | H02M 3/156 |
| | | | 323/271 |
| 2011/0221415 A1* | 9/2011 | Otsuka | H02M 3/1588 |
| | | | 323/283 |
| 2012/0113082 A1 | 5/2012 | Lee | |
| 2015/0022177 A1* | 1/2015 | Petrovic | G05F 1/575 |
| | | | 323/303 |
| 2016/0065060 A1* | 3/2016 | Zhuo | H02M 3/07 |
| | | | 327/536 |

FOREIGN PATENT DOCUMENTS

| | | |
|---|---|---|
| CN | 104269148 A | 1/2015 |
| CN | 107784990 A | 3/2018 |
| CN | 207781164 U | 8/2018 |
| CN | 109410880 A | 3/2019 |
| CN | 110120201 A | 8/2019 |

\* cited by examiner

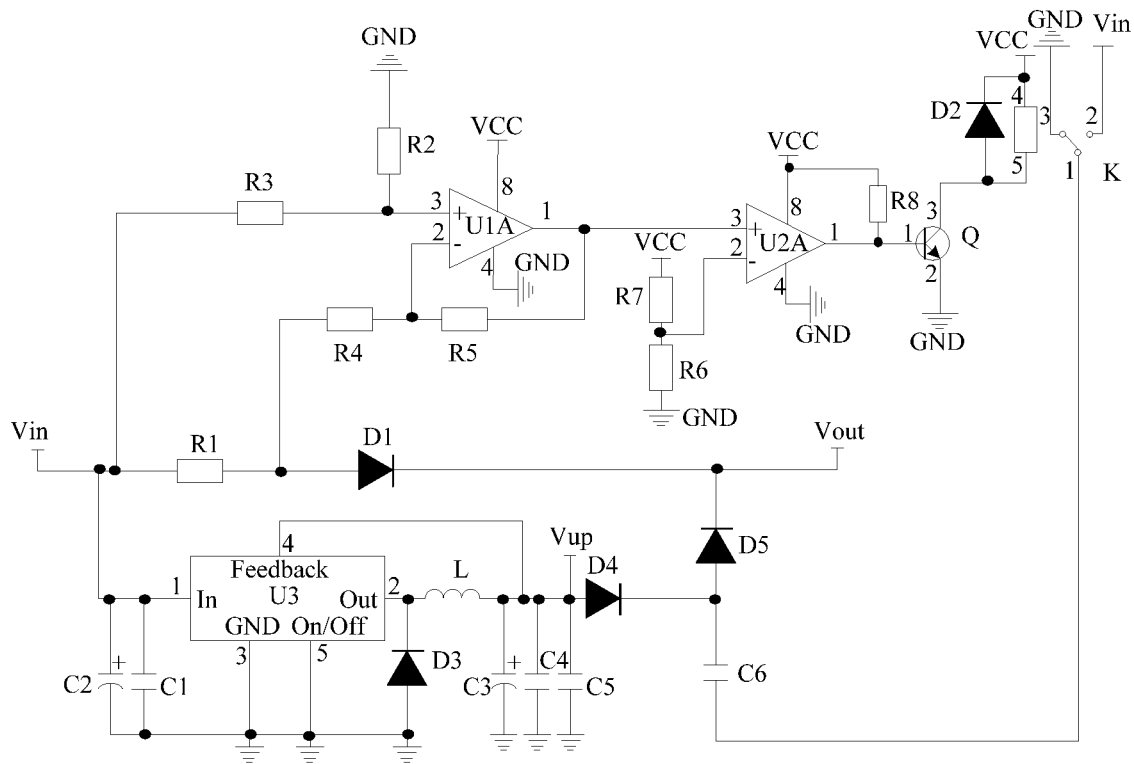

Fig. 7

A sampling sub-circuit detects a potential difference between a voltage output terminal and a voltage input terminal to obtain a first voltage ~ 100

A control sub-circuit compares a magnitude of the first voltage with a preset first voltage threshold, and if the first voltage is less than the preset first voltage threshold, outputs a voltage received by the voltage input terminal to the voltage output terminal; if the first voltage is greater than or equal to the preset first voltage threshold, superimposes the voltage received by the voltage input terminal and a preset bootstrap voltage, and then outputs it to the voltage output terminal ~ 200

Fig. 8

VOLTAGE CONTROL CIRCUIT, CONTROL METHOD THEREOF, AND DISPLAY DEVICE

CROSS-REFERENCE TO RELATED APPLICATIONS

The present application claims the benefit of and priority to Chinese Patent Application No. 201911007083.6 filed Oct. 22, 2019, the contents of which are incorporated by reference in their entirety herein.

TECHNICAL FIELD

This disclosure relates to, but is not limited to, the field of display technology and, in particular, relates to a voltage control circuit, a control method thereof, and a display device.

BACKGROUND

When a display panel is powered off, charges in all pixels need to be discharged to make a screen completely black and prevent the abnormality of a shutdown screen. An existing method for releasing charge is to pull up all control signals inputted to a voltage control circuit during shutdown, so that potential of a signal output terminal of the voltage control circuit is pulled up, whereby all switching transistors connected to pixels are turned on and voltages in the pixels are released.

However, when the display panel is turned off or powered down, a power supply has been cut off, and a gate-on voltage (VGH) has gradually dropped to a ground potential. In this process, it is difficult to discharge the residual charges in the pixels cleanly, which causes the display panel in the related art to have insufficient discharge and an undesirable phenomenon, such as a splash screen or an afterimage, may occur when the display panel is turned on thereafter.

SUMMARY

An embodiment of the present disclosure provides a voltage control circuit, including: a sampling sub-circuit and a control sub-circuit, wherein:

the sampling sub-circuit is configured to detect a potential difference between an output voltage and an input voltage, obtain a first voltage, and output the first voltage to the control sub-circuit;

the control sub-circuit is configured to compare a magnitude of the first voltage with a preset first voltage threshold and, if the first voltage is less than the preset first voltage threshold, the input voltage is outputted as the output voltage. If the first voltage is greater than or equal to the preset first voltage threshold, the input voltage and a preset bootstrap voltage are superimposed and then outputted as the output voltage.

In an exemplary embodiment, the control sub-circuit is specifically configured to:

amplify the first voltage to obtain a second voltage; compare a magnitude of the second voltage with a preset second voltage threshold and, if the second voltage is less than the preset second voltage threshold, the input voltage is outputted as the output voltage. If the second voltage is greater than or equal to the preset second voltage threshold value, the input voltage and the preset bootstrap voltage are superimposed and then outputted as the output voltage.

In an exemplary embodiment, the control sub-circuit includes: an amplification sub-circuit, a comparison sub-circuit, and an energy storage sub-circuit, wherein:

the amplification sub-circuit is configured to amplify the first voltage to obtain the second voltage;

the comparison sub-circuit is configured to compare the magnitude of the second voltage with the preset second voltage threshold and. if the second voltage is less than the preset second voltage threshold, a ground signal is outputted to the energy storage sub-circuit. If the second voltage is greater than or equal to the preset second voltage threshold, an input voltage signal is outputted to the energy storage sub-circuit.

The energy storage sub-circuit is configured to step down the input voltage to generate a bootstrap voltage, and when the ground signal outputted from the comparison sub-circuit is received, the input voltage is outputted as the output voltage. When the input voltage signal outputted from the comparison sub-circuit is obtained, the input voltage and the generated bootstrap voltage are superimposed and then outputted as the output voltage.

In an exemplary embodiment, the sampling sub-circuit includes: a first resistor and a first diode, wherein:

one terminal of the first resistor is connected to a voltage input terminal, another terminal of the first resistor is connected to an anode terminal of the first diode, and a cathode terminal of the first diode is connected to a voltage output terminal.

In an exemplary embodiment, the amplification sub-circuit includes an operational amplifier, a second resistor, a third resistor, a fourth resistor, and a fifth resistor, wherein:

a non-inverting input terminal of the operational amplifier is grounded through the second resistor and is connected to the voltage input terminal through the third resistor; an inverting input terminal of the operational amplifier is connected to the sampling sub-circuit through the fourth resistor and is connected to an output terminal of the operational amplifier through the fifth resistor; a power supply positive electrode terminal of the operational amplifier is connected to a first reference voltage input terminal, and a power supply negative electrode terminal of the operational amplifier is grounded.

In an exemplary embodiment, the comparison sub-circuit includes: a voltage comparator, a sixth resistor, a seventh resistor, an eighth resistor, a transistor, a second diode, and a relay, wherein:

a non-inverting input terminal of the voltage comparator is connected to an output terminal of the amplification sub-circuit, an inverting input terminal of the voltage comparator is grounded through the sixth resistor and is connected to the first reference voltage input terminal through the seventh resistor, an output terminal of the voltage comparator is connected to the first reference voltage input terminal through the eighth resistor, a power supply positive electrode terminal of the voltage comparator is connected to the first reference voltage input terminal, and a power supply negative electrode terminal of the voltage comparator is grounded.

A control electrode of the transistor is connected to the output terminal of the voltage comparator, a first electrode of the transistor is grounded, a second electrode of the transistor is respectively connected to an anode of the second diode and one terminal of a coil of the relay, a cathode of the second diode and another terminal of the coil of the relay are respectively connected to the first reference voltage input terminal, a common contact of the relay is connected to the energy storage sub-circuit, a normally open contact of the relay is connected to the voltage input terminal, and a normally closed contact of the relay is grounded.

In an exemplary embodiment, the energy storage sub-circuit includes a buck chip, a first capacitor, a second electrolytic capacitor, a third electrolytic capacitor, a fourth capacitor, a fifth capacitor, a sixth capacitor, a third diode, a fourth diode, a fifth diode and an inductor, wherein:

a power supply input terminal of the buck chip is connected to the voltage input terminal, and is connected to a ground terminal of the buck chip through the first capacitor, and the second electrolytic capacitor is connected in parallel at both terminals of the first capacitor; the ground terminal and a switching terminal of the buck chip are grounded, an output terminal of the buck chip is respectively connected to a cathode terminal of the third diode and one terminal of the inductor, another terminal of the inductor is respectively connected to a feedback terminal of the buck chip, a positive electrode of the third electrolytic capacitor, one terminal of the fourth capacitor, one terminal of the fifth capacitor and an anode terminal of the fourth diode, an anode terminal of the third diode, an anode of the third electrolytic capacitor, another terminal of the fourth capacitor, and another terminal of the fifth capacitor are all grounded, a cathode terminal of the fourth diode is connected to one terminal of the sixth capacitor and an anode terminal of the fifth diode, another terminal of the sixth capacitor is connected to the common contact of the relay, and a cathode terminal of the fifth diode is connected to an output terminal of the sampling sub-circuit and the voltage output terminal, respectively.

In an exemplary embodiment, the sampling sub-circuit includes: a first resistor and a first diode; the amplification sub-circuit includes: an operational amplifier, a second resistor, a third resistor, a fourth resistor, and a fifth resistor; the comparison sub-circuit includes: a voltage comparator, a sixth resistor, a seventh resistor, an eighth resistor, a transistor, a second diode, and a relay; the energy storage sub-circuit includes: a buck chip, a first capacitor, a second electrolytic capacitor, a third electrolytic capacitor, a fourth capacitor, a fifth capacitor, a sixth capacitor, a third diode, a fourth diode, a fifth diode, and an inductor, wherein:

one terminal of the first resistor is connected to a voltage input terminal, another terminal of the first resistor is connected to an anode terminal of the first diode, and a cathode terminal of the first diode is connected to a voltage output terminal;

a non-inverting input terminal of the operational amplifier is grounded through the second resistor and is connected to the voltage input terminal through the third resistor; an inverting input terminal of the operational amplifier is connected to an output terminal of the operational amplifier through the fifth resistor and is connected to one terminal of the fourth resistor, another terminal of the fourth resistor is connected to the other terminal of the first resistor and the anode terminal of the first diode, a power supply positive electrode terminal of the operational amplifier is connected to a first reference voltage input terminal, and a power supply negative electrode terminal of the operational amplifier is grounded;

a non-inverting input terminal of the voltage comparator is connected to an output terminal of the operational amplifier, an inverting input terminal of the voltage comparator is grounded through the sixth resistor and is connected to the first reference voltage input terminal through the seventh resistor, an output terminal of the voltage comparator is connected to the first reference voltage input terminal through the eighth resistor, a power supply positive electrode terminal of the voltage comparator is connected to the first reference voltage input terminal, and a power supply negative electrode terminal of the voltage comparator is grounded; a control electrode of the transistor is connected to the output terminal of the voltage comparator, a first electrode of the transistor is grounded, a second electrode of the transistor is connected to an anode of the second diode and one terminal of a coil of the relay, a cathode of the second diode and another terminal of the coil of the relay are respectively connected to the first reference voltage input terminal, a common contact of the relay is connected to one terminal of the sixth capacitor, a normally open contact of the relay is connected to the voltage input terminal, and a normally closed contact of the relay is grounded;

a power supply input terminal of the buck chip is connected to the voltage input terminal and is connected to a ground terminal of the buck chip through the first capacitor, and the second electrolytic capacitor is connected in parallel at both terminals of the first capacitor; the ground terminal and a switch terminal of the buck chip are both grounded, an output terminal of the buck chip is respectively connected to a cathode terminal of the third diode and one terminal of the inductor, another terminal of the inductor is respectively connected to a feedback terminal of the buck chip, a positive electrode of the third electrolytic capacitor, one terminal of the fourth capacitor, one terminal of the fifth capacitor, and the fourth diode and an anode terminal connection, an anode terminal of the third diode, an anode of the third electrolytic capacitor, another terminal of the fourth capacitor, and another terminal of the fifth capacitor are all grounded, a cathode terminal of the fourth diode is respectively connected to another terminal of the sixth capacitor and an anode terminal of the fifth diode, a cathode terminal of the fifth diode is connected to a cathode terminal of the first diode and the voltage output terminal, respectively.

In an exemplary embodiment, the input voltage is a gate-on voltage.

An embodiment of the present disclosure provides a voltage control method, which is applied to the voltage control circuit according to any one of the foregoing, and the method includes:

detecting, by a sampling sub-circuit, a potential difference between a voltage output terminal and a voltage input terminal to obtain a first voltage;

comparing, by a control sub-circuit, a magnitude of the first voltage with a preset first voltage threshold, and if the first voltage is less than the preset first voltage threshold, outputting a voltage received by the voltage input terminal to the voltage output terminal; and, if the first voltage is greater than or equal to the preset first voltage threshold, superimposing the voltage received by the voltage input terminal and a preset bootstrap voltage, and then outputting it to the voltage output terminal.

In a third aspect, an embodiment of the present disclosure provides a display device, including the voltage control circuit according to any one of the foregoing.

In an exemplary embodiment, the display device further includes a level conversion circuit, and the voltage output terminal is connected to a gate-on voltage input terminal of the level conversion circuit.

In an exemplary embodiment, the display device further includes a display panel, the display panel is a double cell display panel, the double cell display panel includes a main display panel and a sub-display panel, the level conversion circuit includes a main gate-on voltage input terminal for turning on a switching transistor of the main display panel and a sub-gate-on voltage input terminal for turning on a switching transistor of the sub-display panel, and the voltage output terminal is connected to the main gate-on voltage input terminal.

Other features and advantages of the present disclosure will be explained in the following description, and partly become apparent from the description, or may be understood by implementing the present disclosure. Other advantages of the present disclosure can be realized and obtained through the schemes described in the description, the claims, and the drawings.

BRIEF DESCRIPTION OF THE DRAWINGS

The drawings are used to provide an understanding of the technical solutions of the present disclosure, and constitute a part of the specification. They are used to explain the technical solutions of the present disclosure together with the embodiments of the present disclosure, and do not constitute a limitation to the technical solutions of the present disclosure.

FIG. 7 is an exemplary equivalent circuit diagram of a voltage control circuit according to an embodiment of the present disclosure;

FIG. 8 is an exemplary flowchart of a voltage control method according to an embodiment of the present disclosure.

DETAILED DESCRIPTION

In order to make the objectives, technical solutions, and advantages of the present invention clear, embodiments of the present invention will be described in detail below with reference to the accompanying drawings. It should be noted that, in the case of no conflict, the embodiments in the present disclosure and the features in the embodiments can be arbitrarily combined with each other.

Unless otherwise defined, the technical terms or scientific terms disclosed in the embodiments of the present invention shall have the ordinary meanings understood by those with ordinary skills in the field to which the present invention belongs. The terms "first", "second", and the like used in the embodiments of the present invention do not indicate any order, quantity, or importance, but are only used to distinguish different components. The terms "include" or "including" and other similar words always include the element or misdetection that precedes the word to cover the elements or objects listed after the word and their equivalents, without excluding other elements.

Those skilled in the art can understand that the transistors used in the embodiments of the present disclosure may be thin film transistors or field effect transistors or other devices with the same characteristics. Because the source and drain of the transistor used here are symmetrical, the source and drain of the transistor can be interchanged. In the embodiment of the present invention, in order to distinguish two electrodes of the transistor except the gate, one of the electrodes is referred to as a first electrode and the other is called a second electrode. The first electrode can be a source or a drain, and the second electrode can be a drain or a source.

Figure 1:
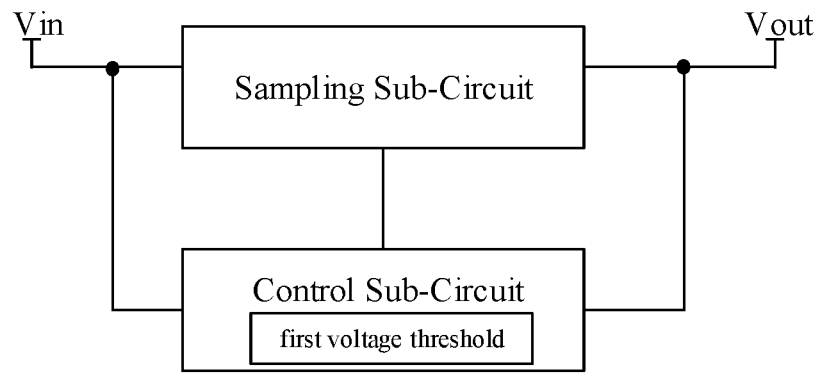
FIG. 1 is an exemplary schematic structural diagram 1 of a voltage control circuit according to an embodiment of the present disclosure.

An embodiment of the present disclosure provides a voltage control circuit. FIG. 1 is a schematic structural diagram of the voltage control circuit provided in the embodiment of the present disclosure. As shown in FIG. 1, the voltage control circuit provided in the embodiment of the present disclosure includes a sampling sub-circuit and a control sub-circuit.

Specifically, the sampling sub-circuit is respectively connected to a voltage input terminal Vin, a voltage output terminal Vout and the control sub-circuit, and is configured to detect a potential difference between the voltage output terminal Vout and the voltage input terminal Vin to obtain a first voltage and output it to the control sub-circuit.

The control sub-circuit is connected to the voltage input terminal Vin, the voltage output terminal Vout and the sampling sub-circuit, respectively, and is configured to compare a magnitude of the first voltage with a preset first voltage threshold. If the first voltage is less than the preset first voltage threshold, a voltage received by the voltage input terminal Vin is outputted to the voltage output terminal Vout. If the first voltage is greater than or equal to the preset first voltage threshold, the voltage received at the voltage input terminal Vin and a preset bootstrap voltage are superimposed and then outputted to the voltage output terminal Vout.

The voltage control circuit of the embodiment of the present disclosure detects a potential difference between the voltage output terminal Vout and the voltage input terminal Vin through the sampling sub-circuit to obtain a first voltage. The control sub-circuit compares the magnitude of the first voltage with the preset first voltage threshold, and outputs the voltage received by the voltage input terminal Vin to the voltage output terminal Vout, for instance, when the first voltage is less than the preset first voltage threshold, and superimposes the voltage received by the voltage input terminal Vin and the preset bootstrap voltage and then outputs it to the voltage output terminal Vout, for instance, when the first voltage is greater than or equal to the preset first voltage threshold, which can automatically increase a voltage at the voltage output terminal Vout when the voltage input terminal Vin is powered off so that a thin film transistor in the display panel can be fully turned on during a discharge process and residual charges in the pixels are discharged cleanly, thereby improving the display quality and operation of the display panel.

In an exemplary embodiment, the control sub-circuit is specifically configured to: amplify the first voltage to obtain a second voltage; compare a magnitude of the second voltage with a preset second voltage threshold, and, if the second voltage is less than the preset second voltage threshold, the voltage received by the voltage input terminal Vin is outputted to the voltage output terminal Vout. If the second voltage is greater than or equal to the preset second voltage threshold, the voltage received by the voltage input terminal Vin and the preset bootstrap voltage are superimposed and then outputted to the voltage output terminal Vout.

The voltage control circuit in the embodiment of the present disclosure detects the potential difference between the voltage output terminal Vout and the voltage input terminal Vin through the sampling sub-circuit to obtain the first voltage, and the control sub-circuit amplifies the first voltage to obtain a second voltage; compares the magnitude of the second voltage and the preset second voltage threshold, and when the second voltage is less than the preset second voltage threshold, the voltage received by the voltage input terminal Vin is outputted to the voltage output terminal Vout. When the second voltage is greater than or equal to the preset voltage threshold, the voltage received by the voltage input terminal Vin is superimposed with a preset bootstrap voltage and then outputted to the voltage output terminal Vout, which can automatically increase the voltage at the voltage output terminal Vout when the voltage input terminal Vin is powered off, so that the thin film transistor in the display panel can be fully turned on during the discharge process and the residual charges in the pixels are discharged cleanly, thereby improving the display quality and operation of the display panel.

Figure 2:
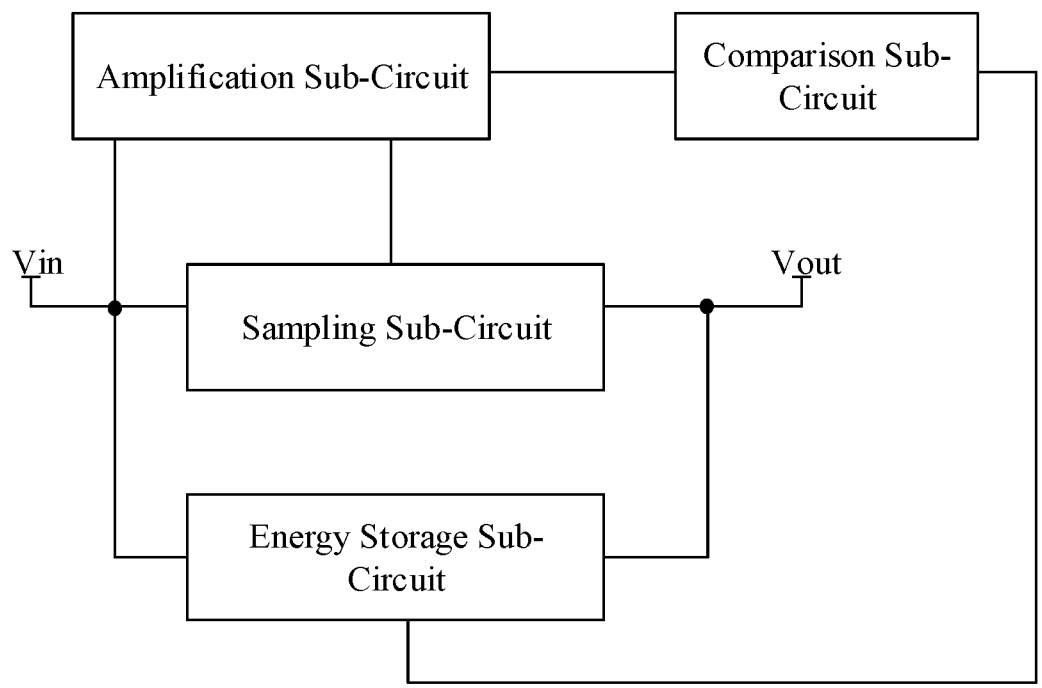
FIG. 2 is an exemplary schematic structural diagram 2 of a voltage control circuit according to an embodiment of the present disclosure.

In an exemplary embodiment, FIG. 2 is a second structural schematic diagram of a voltage control circuit provided in an embodiment of the present disclosure. As shown in FIG. 2, the control sub-circuit provided in the embodiment of the present disclosure includes an amplification sub-circuit, a comparison sub-circuit, and an energy storage sub-circuit.

Specifically, the amplification sub-circuit is respectively connected to a voltage input terminal Vin, a sampling sub-circuit and the comparison sub-circuit, and is configured to amplify a first voltage to obtain a second voltage.

The comparison sub-circuit is respectively connected to the amplification sub-circuit and the energy storage sub-circuit, and is configured to compare a magnitude of the second voltage with a preset second voltage threshold. If the second voltage is less than the preset second voltage threshold, a ground signal is outputted to the energy storage sub-circuit. If the second voltage is greater than or equal to a preset second voltage threshold, a voltage signal at the voltage input terminal Vin is outputted to the energy storage sub-circuit.

The energy storage sub-circuit is respectively connected to the voltage input terminal Vin, a voltage output terminal Vout and the comparison sub-circuit and is configured to step down a voltage at the voltage input terminal Vin to generate a bootstrap voltage. When a ground signal outputted from the comparison sub-circuit is received, a voltage received by the voltage input terminal Vin is outputted to the voltage output terminal Vout. When the voltage signal output from the comparison sub-circuit is received, the voltage received by the voltage input terminal Vin is superimposed with a generated bootstrap voltage and then outputted to the voltage output terminal Vout.

Figure 3:
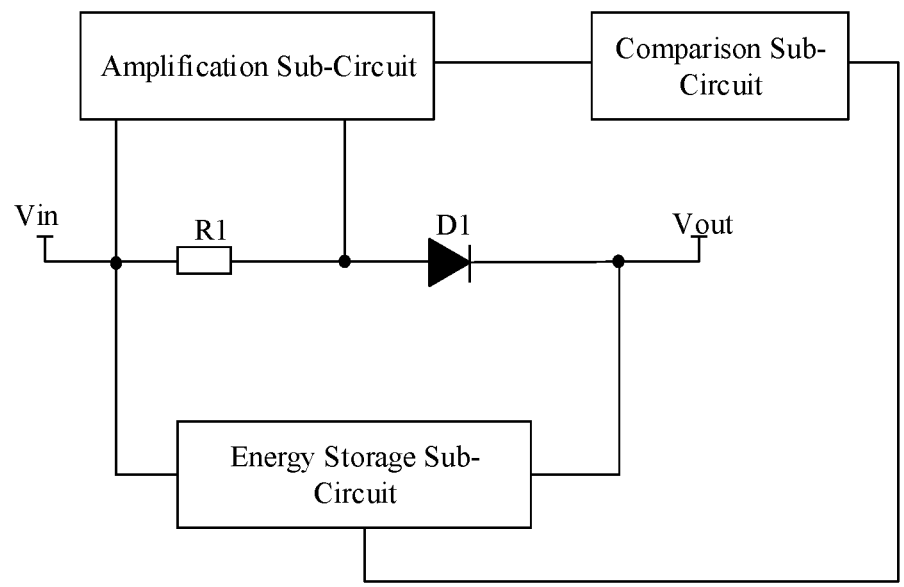
FIG. 3 is an exemplary equivalent circuit diagram of a sampling sub-circuit according to an embodiment of the present disclosure.

In an exemplary embodiment, FIG. 3 is an equivalent circuit diagram of a sampling sub-circuit provided in the embodiment of the present disclosure. As shown in FIG. 3, the sampling sub-circuit provided in the embodiment of the present disclosure includes a first resistor R1 and a first diode D1.

Specifically, one terminal of the first resistor R1 is connected to a voltage input terminal Vin, another terminal of the first resistor R1 is connected to an anode terminal of the first diode D1, and a cathode terminal of the first diode D1 is connected to a voltage output terminal Vout.

An exemplary structure of the sampling sub-circuit is specifically shown in FIG. 3. Those skilled in the art can understand that the implementation of the sampling sub-circuit is not limited to this, as long as it can realize its respective function.

Figure 4:
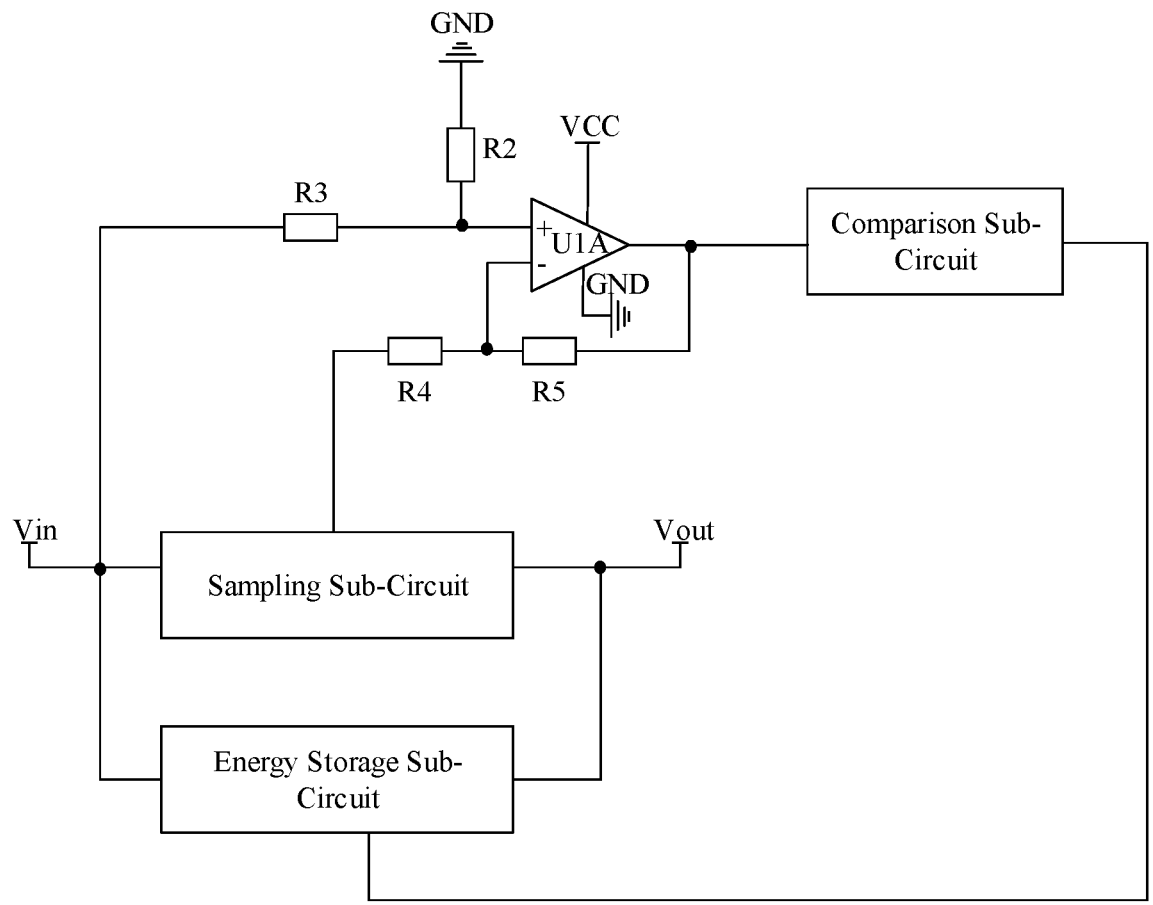
FIG. 4 is an exemplary equivalent circuit diagram of an amplification sub-circuit according to an embodiment of the present disclosure.

In an exemplary embodiment, FIG. 4 is an equivalent circuit diagram of an amplifier sub-circuit provided in the embodiment of the present disclosure. As shown in FIG. 4, the amplifier sub-circuit provided in the embodiment of the present disclosure includes an operational amplifier U1A, a second resistor R2, and a third resistor R3, a fourth resistor R4, and a fifth resistor R5.

Specifically, a non-inverting input terminal of the operational amplifier U1A is grounded through the second resistor R2, and is connected to a voltage input terminal Vin through the third resistor R3. An inverting input terminal of the operational amplifier U1A is connected to the sampling sub-circuit through the fourth resistor R4 and is connected to an output terminal of the operational amplifier U1A through the fifth resistor R5, a power supply positive electrode terminal of the operational amplifier U1A is connected to a first reference voltage input terminal VCC, and a power supply negative electrode terminal of the operational amplifier U1A is grounded.

An exemplary structure of the amplification sub-circuit is specifically shown in FIG. 4. Those skilled in the art can easily understand that the implementation of the amplifier sub-circuit is not limited to this, as long as it can realize its respective function.

In an exemplary embodiment, a voltage input from the first reference voltage input terminal VCC may be a positive 5V DC voltage. In other embodiments, the voltage input by the first reference voltage input terminal VCC may also be a positive 3.3V DC voltage or a DC voltage of any other value.

Figure 5:
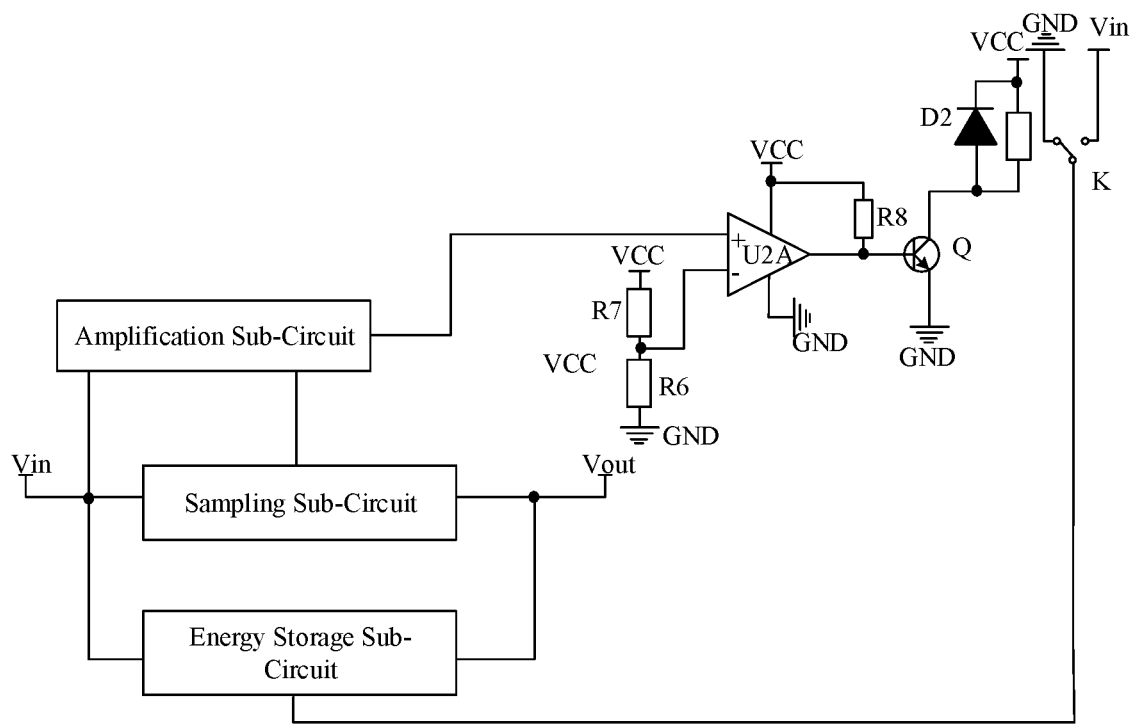
FIG. 5 is an exemplary equivalent circuit diagram of a comparison sub-circuit according to an embodiment of the present disclosure.

In an exemplary embodiment, FIG. 5 is an equivalent circuit diagram of a comparison sub-circuit provided in the embodiment of the present disclosure. As shown in FIG. 5, the comparison sub-circuit provided in the embodiment of the present disclosure includes a voltage comparator U2A, a sixth resistor R6, a resistor R7, an eighth resistor R8, a transistor Q, a second diode D2, and a relay K.

Specifically, a non-inverting input terminal of the voltage comparator U2A is connected to an output terminal of the amplification sub-circuit, an inverting input terminal of the voltage comparator U2A is grounded through the sixth resistor R6 and is connected to a first reference voltage input terminal VCC through the seventh resistor R7, an output terminal of the voltage comparator U2A is connected to the first reference voltage input terminal VCC through the eighth resistor R8, a power supply positive electrode terminal of the voltage comparator U2A is connected to the first reference voltage input terminal VCC, and a power supply negative electrode terminal of the voltage comparator U2A is grounded.

A control electrode of the transistor Q is connected to the output terminal of the voltage comparator U2A, a first electrode of the transistor Q is grounded, a second electrode of the transistor Q is connected to an anode of the second diode D2 and one terminal of a coil of the relay K, a cathode of the second diode D2 and another terminal of the coil of the relay K are respectively connected to a first reference voltage input terminal VCC, a common contact of relay K is connected to an energy storage sub-circuit, a normally open contact of relay K is connected to a voltage input terminal Vin, and a normally closed contact of relay K is grounded.

An exemplary structure of the comparison sub-circuit is specifically shown in FIG. 5. Those skilled in the art can understand that the implementation manner of the comparison sub-circuit is not limited to this, as long as it can realize its respective function.

Figure 6:
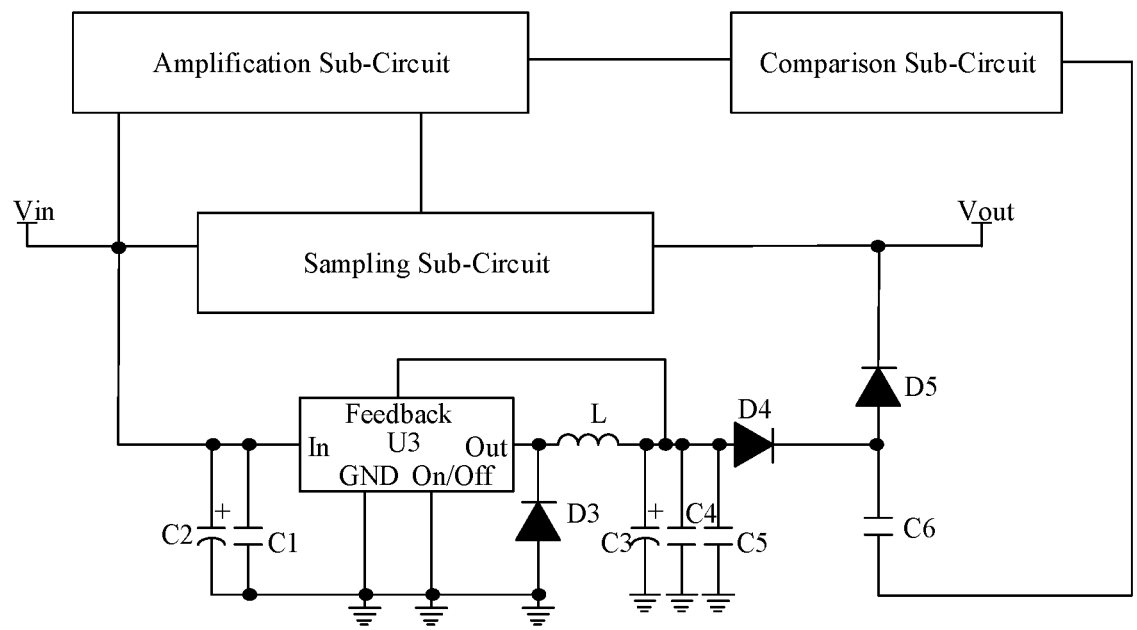
FIG. 6 is an exemplary equivalent circuit diagram of an energy storage sub-circuit according to an embodiment of the present disclosure.

In an exemplary embodiment, FIG. 6 is an equivalent circuit diagram of an energy storage sub-circuit provided in the embodiment of the present disclosure. As shown in FIG. 6, the energy storage sub-circuit provided in the embodiment of the present disclosure includes: a buck chip U3, a first capacitor C1, a second electrolytic capacitor C2, a third electrolytic capacitor C3, a fourth capacitor C4, a fifth capacitor C5, a sixth capacitor C6, a third diode D3, a fourth diode D4, a fifth diode D5, and an inductor L.

Specifically, a power supply input terminal of the buck chip U3 is connected to a voltage input terminal Vin and is connected to a ground terminal of the buck chip U3 through the first capacitor C1, and a second electrolytic capacitor C2 is connected in parallel to both terminals of the first capacitor C1. The ground terminal and a switch terminal of the buck chip U3 are both grounded, an output terminal of the buck chip U3 is respectively connected to a cathode terminal of the third diode D3 and one terminal of the inductor L, another terminal of the inductor L is connected to a feedback terminal of the buck chip U3, an anode of the third electrolytic capacitor C3, one terminal of the fourth capacitor C4, one terminal of the fifth capacitor C5, and an anode terminal of the fourth diode D4, an anode terminal of the third diode D3, a negative electrode of the third electrolytic capacitor C3, another terminal of the fourth capacitor C4, and another terminal of the fifth capacitor C5 are all grounded. A cathode terminal of the fourth diode D4 is respectively connected to one terminal of the sixth capacitor C6 and an anode terminal of the fifth diode D5, another terminal of the sixth capacitor C6 is connected to a common contact of the relay K, and a cathode terminal of the fifth diode D5 is respectively connected to an output terminal of the sampling sub-circuit and a voltage output terminal Vout.

An exemplary structure of the energy storage sub-circuit is specifically shown in FIG. 6. Those skilled in the art can understand that the implementation of the energy storage sub-circuit is not limited to this, as long as it can realize its respective function.

FIG. 7 is an equivalent circuit diagram of a voltage control circuit according to an embodiment of the present invention. As shown in FIG. 7, in the voltage control circuit according to the embodiment of the present disclosure, a sampling sub-circuit includes a first resistor R1 and a first diode D1. An amplifier sub-circuit includes an operational amplifier U1A, a second resistor R2, a third resistor R3, a fourth resistor R4, and a fifth resistor R5. A comparison sub-circuit includes a voltage comparator U2A, a sixth resistor R6, a seventh resistor R7, a first resistor, an eight resistors R8, a transistor Q, a second diode D2, and a relay K. An energy storage sub-circuit includes a buck chip U3, a first capacitor C1, a second electrolytic capacitor C2, a third electrolytic capacitor C3, a fourth capacitor C4, a fifth capacitor C5, a sixth capacitor C6, a third diode D3, a third diode D3, a fourth diode D4, and a fifth diode D5.

Specifically, one terminal of the first resistor R1 is connected to a voltage input terminal Vin, another terminal of the first resistor R1 is connected to an anode terminal of the first diode D1, and a cathode terminal of the first diode D1 is connected to a voltage output terminal Vout.

A non-inverting input terminal of the operational amplifier U1A is grounded through the second resistor R2 and is connected to the voltage input terminal Vin through the third resistor R3, an inverting input terminal of the operational amplifier U1A is connected to an output terminal of the operational amplifier U1A through the fifth resistor R5 and is connected to one terminal of the fourth resistor R4, another terminal of the fourth resistor R4 is respectively connected to the other terminal of the first resistor R1 and the anode terminal of the first diode D1, a power supply positive electrode terminal of the operational amplifier U1A is connected to a first reference voltage input terminal VCC, and a power supply negative electrode terminal of the operational amplifier U1A is grounded.

A non-inverting input terminal of the voltage comparator U2A is connected to the output terminal of the operational amplifier U1A, an inverting input terminal of the voltage comparator U2A is grounded through the sixth resistor R6 and is connected to the first reference voltage input terminal VCC through the seventh resistor R7, the output terminal of the comparator U2A is connected to the first reference voltage input terminal VCC through the eighth resistor R8, a power supply positive electrode terminal of the voltage comparator U2A is connected to the first reference voltage input terminal VCC, and a power supply negative electrode terminal of the voltage comparator U2A is grounded. A control electrode of the transistor Q is connected to the output terminal of the voltage comparator U2A, a first electrode of the transistor Q is grounded, a second electrode of the transistor Q is connected to an anode of second diode D2 and one terminal of a coil of the relay K, a cathode of the electrode D2 and another terminal of the coil of the relay K are respectively connected to the first reference voltage input terminal VCC, a common contact of the relay K is connected to one terminal of the sixth capacitor C6, a normally open contact of the relay K is connected to the voltage input terminal Vin, and a normally closed contact of the relay K is grounded.

A power supply input terminal of the buck chip U3 is connected to the voltage input terminal Vin and is connected to a ground terminal of the buck chip U3 through the first capacitor C1, and a second electrolytic capacitor C2 is connected in parallel to both terminals of the first capacitor C1. The ground terminal and a switch terminal of the buck chip U3 are both grounded, an output terminal of the buck chip U3 is respectively connected to a cathode terminal of the third diode D3 and one terminal of the inductor L, another terminal of the inductor L is connected to a feedback terminal of the buck chip U3, an anode of the third electrolytic capacitor C3, one terminal of the fourth capacitor C4, one terminal of the fifth capacitor C5, and an anode terminal of the fourth diode D4, an anode terminal of the third diode D3. A negative electrode of the third electrolytic capacitor C3, another terminal of the fourth capacitor C4, and another terminal of the fifth capacitor C5 are all grounded. A cathode terminal of the fourth diode D4 is connected to another terminal of the sixth capacitor C6 and an anode terminal of the fifth diode D5. A cathode terminal of the fifth diode D5 is respectively connected to a cathode terminal of the first diode D1 and a voltage output terminal Vout.

Exemplary structures of the sampling sub-circuit, the amplification sub-circuit, the comparison sub-circuit, and the energy storage sub-circuit are specifically shown in FIG. 7. Those skilled in the art can understand that the implementation manners of the above sub-circuits are not limited to this, as long as they can achieve their respective functions.

In an exemplary embodiment, the input voltage in the embodiment of the present disclosure may be a gate-on voltage (VGH) of a shift register switch transistor.

In the embodiment of the present disclosure, a potential difference between the voltage input terminal Vin and the voltage output terminal Vout of the gate-on voltage is detected by the voltage control circuit. When a display panel is turned off or powered down, the potential difference instantly increases. When the potential difference reaches to a preset threshold, an output voltage of the voltage output terminal Vout is increased to completely turned on a gate of a switching transistor and avoid screen scanning, afterimages, and other bad or undesirable phenomena when shutting down.

It should be noted that the voltage control circuit of the present disclosure can be configured to perform lifting control of the gate-on voltage VGH, and can also be configured to perform lifting control of voltage other than VGH.

In an exemplary embodiment, a bootstrap voltage is greater than or equal to a threshold voltage of a switching transistor.

In this embodiment, the transistor Q may be an N-type thin film transistor or a P-type thin film transistor. A thin film transistor (TFT) may specifically select a bottom-gate structure thin film transistor or a top-gate structure thin film transistor, as long as it can realize a switching function.

It should be noted that the capacitors C2-C3 are electrolytic capacitors, and the capacitors C1 and C4 to C6 are ordinary capacitors.

The technical solution of the embodiment of the present invention is further described below through the working process of the voltage control circuit. Taking the transistor Q in the voltage control circuit provided in the embodiment of the present invention as an N-type thin film transistor as an example, its working process includes:

I) During a start-up phase of the display panel, the gate-on voltage VGH does not start until a digital positive voltage DVDD is powered on. Therefore, the voltage control circuit in the embodiment of the present disclosure has no effect on the start-up.

II) In a normal display stage of the display panel, when the display panel is working normally, a potential difference V1 between two terminals of a first resistor R1 is small, and a current flowing through the first resistor R1 is also small. The potential difference V1 between the two terminals of the first resistor R1 is amplified by an amplifying sub-circuit to obtain a second voltage V2 (that is, a voltage of the pin 1 of an operational amplifier U1A), wherein resistances of a second resistor R2, a third resistor R3, a fourth resistor R4, and a fifth resistor R5 determine a amplification factor.

After a 5V input voltage of a first reference voltage input terminal VCC is divided by a sixth resistor R6, and a seventh resistor R7, a voltage V3 of the pin 2 of a voltage comparator U2A (that is, a preset second voltage threshold) is preset, where V3=5V*R6/(R6+R7). A second voltage V2 outputted by the pin 1 of the operational amplifier U1A is inputted to the pin 3 of the voltage comparator U2A.

By setting a proper magnification and a suitable second voltage threshold, the second voltage V2 is less than the preset second voltage threshold V3 when the display panel is normally displayed, the pin 1 of the voltage comparator U2A outputs a low level, the transistor Q is not turned on, the pin 3 of the transistor Q is in a floating state, and the relay K is in an original state, that is, the state that the pin 1 is connected to the pin 3 of the relay K, and the comparison sub-circuit outputs a ground signal to a lower terminal of the sixth capacitor C6.

When the display panel works normally, an input voltage at the voltage input terminal Vin is output to the 1 pin of the buck chip U3, an output terminal of 2 pin of the buck chip U3 outputs a bootstrap voltage Vup (according to actual needs, a value of the bootstrap voltage Vup can be set to about 5~15V), the bootstrap voltage Vup is added to an upper terminal of the sixth capacitor C6, that is, when the display panel works normally, the lower terminal of the sixth capacitor C6 is connected to the 3 pin of the relay K, that is, the potential difference of Vup is always maintained between two terminals of the sixth capacitor C6. A function of the first capacitor C1, the second electrolytic capacitor C2, the third electrolytic capacitor C3, the fourth capacitor C4, and the fifth capacitor C5 is a filtering function, and the sixth capacitor C6 is a bootstrap capacitor to achieve a bootstrap function. A function of the third diode D3 is to cut off and turn on a power when the power is reversely connected to prevent the power from being burned out. A voltage at a lower terminal of the fifth diode D5 is the bootstrap voltage Vup, a voltage at an upper terminal is the input voltage Vin, and an output voltage at the voltage output terminal Vout is equal to the input voltage Vin.

III) During a shutdown phase of the display panel, the input voltage Vin at the voltage input terminal will follow power down, a large potential difference V1 will be generated between the two terminals of the first resistor R1 at the moment of power down, a value of the current flowing through the first resistor R1 is I1=V1/R1, and when a 8K large-size display panel is powered off, an instantaneous value of V1 and I1 is larger.

The potential difference V1 between the two terminals of the first resistor R1 is amplified by the amplification sub-circuit to obtain the second voltage V2 (that is, the voltage of 1 pin of the operational amplifier U1A). The second resistor R2, resistances of the third resistor R3, the fourth resistor R4, and the fifth resistor R5 determine the magnification.

When the second voltage V2 is less than the preset second voltage threshold V3, the 1 pin of the voltage comparator U2A outputs a low level, the transistor Q is not turned on, the 3 pin of the transistor Q is in a floating state, and the relay K is in the original state, that is, the relay K 1 foot is closed to the 3 pin state.

When the second voltage V2 is greater than or equal to the preset second voltage threshold V3, the 1 pin of the voltage comparator U2A outputs a high level, the transistor Q is turned on, the 3 pin of the transistor Q is in a GND state, and the relay K is in a jump state, that is, the 1 pin of the relay K is closed to a 2 pin state.

The second diode D2 is a freewheeling diode, which is configured to prevent a back EMF generated when the relay K is turned off from affecting a circuit or damaging the components, and the second diode D2 connected in anti-parallel can provide a loop for the back EMF.

In response to the sixth capacitor C6 "suddenly" jumping to the input voltage Vin at the voltage input terminal, a transient voltage at the upper terminal of the sixth capacitor C6 becomes Vin+Vup due to the potential difference between the two terminals of the sixth capacitor C6 is Vup. In response to a voltage at the lower terminal of the fifth diode D5 "suddenly" jumping to Vin+Vup, the upper terminal of the fifth diode D5, that is, the voltage output terminal Vout, also follows the jump to Vin+Vup.

The fourth diode D4 is configured to prevent voltage backflow, a left-terminal voltage is Vup, and a right-terminal voltage is Vin+Vup. The first diode D1 is configured to prevent the voltage backflow, a left-terminal voltage is Vin, and a right-terminal voltage is Vin+Vup.

As an example, it is assumed that the gate-on voltage VGH of the display panel is 32V, and the bootstrap voltage Vup set in the embodiment of this disclosure is 15V. When the display panel works normally, the output voltage Vout is equal to the input voltage Vin and is also 32V, which provides a reference voltage for a gate driver on array (GOA) signal and turns on pixel gates of each row in turn.

When the display panel is powered off, all clock signals CLK are about to enter a full-opened (XON) phase, and all of the pixel gates are turned on. However, at this time, the VGH input voltage has slowly been lowered (for example, reduced to 17V), so that the pixel gates on the display panel in the related art are not fully turned on, and residual charges in the pixel are not cleanly released, which may cause screen scans, afterimages, and other undesirable phenomena.

After using the voltage control circuit of the embodiment of the present disclosure, when the display panel is powered off and the potential difference between the voltage input terminal Vin and the voltage output terminal Vout of the voltage control circuit increases and reaches to a certain threshold, Vout=Vin+Vup=17V+15V=32V, so that the gate-on voltage VGH is controlled to make the gate turned on completely, thereby avoiding screen scanning, afterimages, and other undesirable phenomena during shutdown.

Based on a same concept, some embodiments of the present invention further provide a voltage control method which is applied to the voltage control circuit provided in the foregoing embodiment. The voltage control circuit includes a sampling sub-circuit, a control sub-circuit, a voltage input terminal, and a voltage output terminal. FIG. 8 is a flowchart of the voltage control method according to an embodiment of the present invention. As shown in FIG. 8, the method specifically includes the following steps:

step 100: detecting, by the sampling sub-circuit, a potential difference between the voltage output terminal and the voltage input terminal to obtain a first voltage;

step 200: comparing, by the control sub-circuit, a magnitude of the first voltage with a preset first voltage threshold and, if the first voltage is less than the preset first voltage threshold, outputting a voltage received by the voltage input terminal to the voltage output terminal; if the first voltage is greater than or equal to the preset first voltage threshold, superimposing the voltage received by the voltage input terminal and a preset bootstrap voltage, and then outputting it to the voltage output terminal.

In an exemplary embodiment, the step 200 specifically includes:

amplifying, by the control sub-circuit, the first voltage to obtain a second voltage; comparing the second voltage with a preset second voltage threshold, and if the second voltage is less than the preset second voltage threshold, outputting a voltage received by the voltage input terminal to the voltage output terminal; if the second voltage is greater than or equal to the preset second voltage threshold, superimposing the voltage received by the voltage input terminal with the preset bootstrap voltage and then outputting it to the voltage output terminal.

The technical solution provided in the embodiment of the present disclosure detects a potential difference between a voltage output terminal and a voltage input terminal through a sampling sub-circuit to obtain a first voltage, and the control sub-circuit compares the magnitude of the first voltage with a preset first voltage threshold. When the first voltage is less than the preset first voltage threshold, the voltage received by the voltage input terminal is outputted to the voltage output terminal. When the first voltage is greater than or equal to the preset first voltage threshold, the voltage received by the voltage input terminal is equal to the preset voltage and a bootstrap voltage is superimposed and then outputted to the voltage output terminal, which can automatically increase a voltage at the voltage output terminal when the voltage input terminal is powered off, so that a thin film transistor in the display panel can be fully turned on during a discharge process, and residual charges in the pixels are discharged cleanly, thereby improving the display quality and operation of the display panel.

Based on the same inventive concept, an embodiment of the present invention further provides a display device including the voltage control circuit as described above.

A voltage control circuit is a voltage control circuit provided in a first embodiment, and its implementation principles and effects are similar, which are not described herein again.

In an exemplary embodiment, the display device further includes a level shift IC, and the voltage output terminal is connected to a gate-on voltage input terminal of the level shift circuit.

Figure 9:
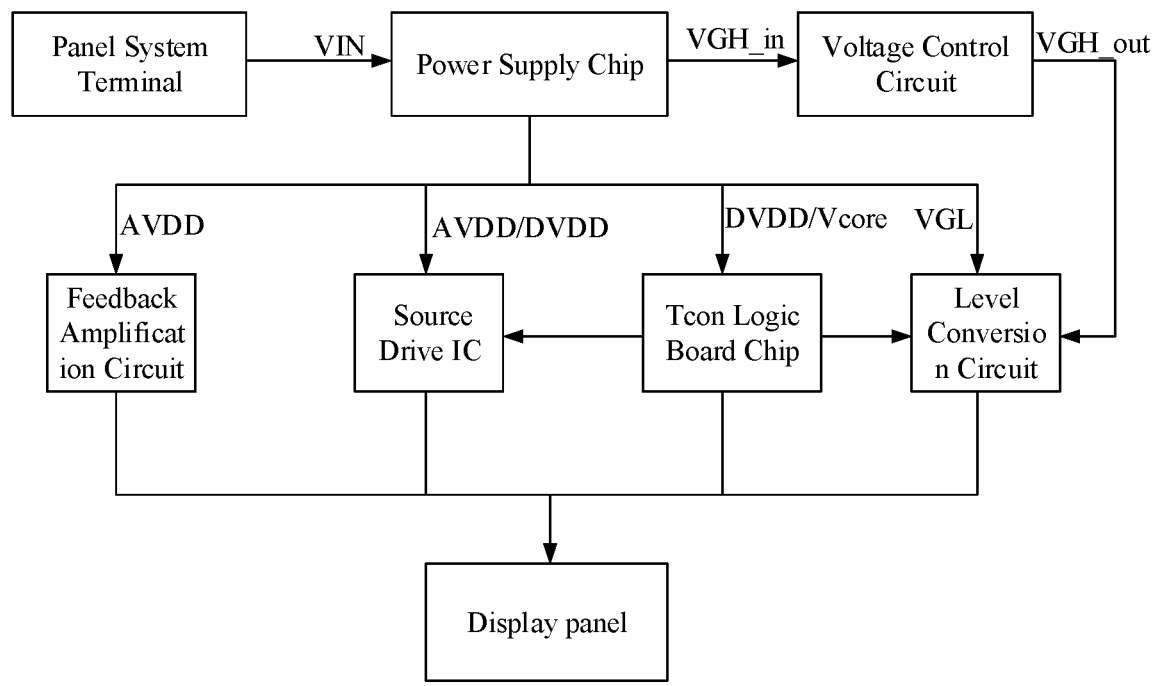
FIG. 9 is an exemplary flowchart of a display panel according to an embodiment of the present disclosure.

FIG. 9 is an exemplary schematic structural diagram of a display device according to an embodiment of the present disclosure. As shown in FIG. 9, a voltage control circuit according to the embodiment of the present disclosure is disposed between a power IC and a level conversion circuit, wherein AVDD is an analog positive power supply, DVDD is a digital positive power supply, VGL is a gate-off Voltage, and Vcore is a core voltage.

It should be noted that the voltage control circuit of the present disclosure can be configured to perform lifting control of the gate-on voltage VGH, and can also be configured to perform lifting control of voltage other than VGH.

In an exemplary embodiment, the display device further includes a display panel. The display panel is a dual cell display panel. The dual cell display panel includes a main display panel and a sub-display panel. The level conversion circuit includes a main gate turn-on voltage input terminal for turning on a switching transistor of the main display panel and a sub-gate-on voltage input terminal for turning on a switching transistor of the sub-display panel. The voltage output terminal is connected to the main gate turn-on voltage input terminal.

It should be noted that the voltage control circuit of the present disclosure can be used in a display device of a single cell display panel or a double cell display panel, and can also be used in a Thin Film Transistor-Liquid Crystal Display (TFT-LCD) or an Organic Light Emitting Display (OLED) display device.

The drawings of the embodiments of the present invention only relate to the structures involved in the embodiments of the present invention. For other structures, refer to the general design.

In the case of no conflict, the embodiments of the present invention, that is, features in the embodiments, can be combined with each other to obtain a new embodiment.

Although the embodiments disclosed in the present invention are as described above, the content described is only an embodiment adopted for facilitating understanding of the present invention, and is not intended to limit the present invention. Any person skilled in the art to which this invention pertains may make any modifications and changes in the form and details of implementation without departing from the spirit and scope disclosed by this invention, but the scope of patent protection of this invention must still be subject to the scope defined by the appended claims.

What is claimed is:

1. A voltage control circuit, comprising:
a sampling sub-circuit and a control sub-circuit, wherein:
the sampling sub-circuit is configured to detect a potential difference between an output voltage and an input voltage, obtain a first voltage, and output the first voltage to the control sub-circuit; and
the control sub-circuit is configured to compare the first voltage with a first voltage threshold, if the first voltage is less than the first voltage threshold, output the input voltage as the output voltage, and, if the first voltage is greater than or equal to the first voltage threshold, superimpose and output the input voltage and a bootstrap voltage as the output voltage;
the control sub-circuit comprises an amplification sub-circuit, a comparison sub-circuit, and an energy storage sub-circuit;
the amplification sub-circuit is configured to amplify the first voltage to obtain a second voltage;
the comparison sub-circuit is configured to compare the second voltage with a second voltage threshold, output a ground signal to the energy storage sub-circuit if the second voltage is less than the second voltage threshold, and output an input voltage signal to the energy storage sub-circuit if the second voltage is greater than or equal to the second voltage threshold; and
the energy storage sub-circuit is configured to step down the input voltage to generate a bootstrap voltage, output the input voltage as the output voltage in an instance in which the ground signal outputted from the comparison sub-circuit is received, and superimpose and output the input voltage and the generated bootstrap voltage as the output voltage in an instance in which the input voltage signal outputted from the comparison sub-circuit is obtained.

2. The voltage control circuit according to claim 1, wherein the sampling sub-circuit comprises a first resistor and a first diode, wherein:
one terminal of the first resistor is connected to a voltage input terminal, another terminal of the first resistor is connected to an anode terminal of the first diode, and a cathode terminal of the first diode is connected to a voltage output terminal.

3. The voltage control circuit according to claim 1, wherein the amplification sub-circuit comprises:
an operational amplifier, a second resistor, a third resistor, a fourth resistor, and a fifth resistor, wherein:
a non-inverting input terminal of the operational amplifier is grounded through the second resistor and is connected to the voltage input terminal through the third resistor;
an inverting input terminal of the operational amplifier is connected to the sampling sub-circuit through the fourth resistor and is connected to an output terminal of the operational amplifier through the fifth resistor;
a power supply positive electrode terminal of the operational amplifier is connected to a first reference voltage input terminal; and
a power supply negative electrode terminal of the operational amplifier is grounded.

4. The voltage control circuit according to claim 1, wherein the comparison sub-circuit comprises:
a voltage comparator, a sixth resistor, a seventh resistor, an eighth resistor, a transistor, a second diode, and a relay, wherein:
a non-inverting input terminal of the voltage comparator is connected to an output terminal of the amplification sub-circuit;
an inverting input terminal of the voltage comparator is grounded through the sixth resistor and is connected to the first reference voltage input terminal through the seventh resistor;
an output terminal of the voltage comparator is connected to the first reference voltage input terminal through the eighth resistor;
a power supply positive electrode terminal of the voltage comparator is connected to the first reference voltage input terminal;
a power supply negative electrode terminal of the voltage comparator is grounded;
a control electrode of the transistor is connected to the output terminal of the voltage comparator;
a first electrode of the transistor is grounded;
a second electrode of the transistor is respectively connected to an anode of the second diode and one terminal of a coil of the relay;
a cathode of the second diode and another terminal of the coil of the relay are respectively connected to the first reference voltage input terminal;
a common contact of the relay is connected to the energy storage sub-circuit; a normally open contact of the relay is connected to the voltage input terminal; and
a normally closed contact of the relay is grounded.

5. The voltage control circuit according to claim 1, wherein the energy storage sub-circuit comprises:
a buck chip, a first capacitor, a second electrolytic capacitor, a third electrolytic capacitor, a fourth capacitor, a fifth capacitor, a sixth capacitor, a third diode, a fourth diode, a fifth diode and an inductor, wherein:
a power supply input terminal of the buck chip is connected to a voltage input terminal, and is connected to a ground terminal of the buck chip through the first capacitor, and the second electrolytic capacitor is connected in parallel at both terminals of the first capacitor;
the ground terminal and a switching terminal of the buck chip are grounded;
an output terminal of the buck chip is respectively connected to a cathode terminal of the third diode and one terminal of the inductor, another terminal of the inductor is respectively connected to a feedback terminal of the buck chip;
a positive electrode of the third electrolytic capacitor, one terminal of the fourth capacitor, one terminal of the fifth capacitor and an anode terminal of the fourth diode, an anode terminal of the third diode, an anode of the third electrolytic capacitor, another terminal of the fourth capacitor, and another terminal of the fifth capacitor are all grounded;
a cathode terminal of the fourth diode is connected to one terminal of the sixth capacitor and an anode terminal of the fifth diode, another terminal of the sixth capacitor is connected to the common contact of the relay; and
a cathode terminal of the fifth diode is connected to an output terminal of the sampling sub-circuit and a voltage output terminal, respectively.

6. The voltage control circuit according to claim 1, wherein the sampling sub-circuit comprises:
a first resistor and a first diode;
the amplification sub-circuit comprises: an operational amplifier, a second resistor, a third resistor, a fourth resistor, and a fifth resistor;
the comparison sub-circuit comprises: a voltage comparator, a sixth resistor, a seventh resistor, an eighth resistor, a transistor, a second diode, and a relay;
the energy storage sub-circuit comprises: a buck chip, a first capacitor, a second electrolytic capacitor, a third electrolytic capacitor, a fourth capacitor, a fifth capacitor, a sixth capacitor, a third diode, a fourth diode, a fifth diode and an inductor, wherein:
one terminal of the first resistor is connected to a voltage input terminal, another terminal of the first resistor is connected to an anode terminal of the first diode, and a cathode terminal of the first diode is connected to a voltage output terminal;
a non-inverting input terminal of the operational amplifier is grounded through the second resistor and is connected to the voltage input terminal through the third resistor;
an inverting input terminal of the operational amplifier is connected to an output terminal of the operational amplifier through the fifth resistor and is connected to one terminal of the fourth resistor, another terminal of the fourth resistor is connected to another terminal of the first resistor and the anode terminal of the first diode, a power supply positive electrode terminal of the operational amplifier is connected to a first reference voltage input terminal, and a power supply negative electrode terminal of the operational amplifier is grounded;
a non-inverting input terminal of the voltage comparator is connected to an output terminal of the operational amplifier, an inverting input terminal of the voltage comparator is grounded through the sixth resistor and is connected to the first reference voltage input terminal through the seventh resistor, an output terminal of the voltage comparator is connected to the first reference voltage input terminal through the eighth resistor, a power supply positive electrode terminal of the voltage comparator is connected to the first reference voltage input terminal, and a power supply negative electrode terminal of the voltage comparator is grounded;
a control electrode of the transistor is connected to the output terminal of the voltage comparator, a first electrode of the transistor is grounded, a second electrode of the transistor is connected to an anode of the second diode and one terminal of a coil of the relay, a cathode of the second diode and another terminal of the coil of the relay are respectively connected to the first reference voltage input terminal, a common contact of the relay is connected to one terminal of the sixth capacitor, a normally open contact of the relay is connected to the voltage input terminal, and a normally closed contact of the relay is grounded;
a power supply input terminal of the buck chip is connected to the voltage input terminal and is connected to a ground terminal of the buck chip through the first capacitor, and the second electrolytic capacitor is connected in parallel at both terminals of the first capacitor;

the ground terminal and a switch terminal of the buck chip are both grounded, an output terminal of the buck chip is respectively connected to a cathode terminal of the third diode and one terminal of the inductor, another terminal of the inductor is respectively connected to a feedback terminal of the buck chip;
a positive electrode of the third electrolytic capacitor, one terminal of the fourth capacitor, one terminal of the fifth capacitor, and the fourth diode and an anode terminal connection, an anode terminal of the third diode, an anode of the third electrolytic capacitor, another terminal of the fourth capacitor, and another terminal of the fifth capacitor are all grounded;
a cathode terminal of the fourth diode is respectively connected to another terminal of the sixth capacitor and an anode terminal of the fifth diode; and
a cathode terminal of the fifth diode is connected to a cathode terminal of the first diode and the voltage output terminal, respectively.

7. The voltage control circuit according to claim 1, wherein the input voltage is a gate-on voltage.

8. A voltage control method, applied to a voltage control circuit comprising a sampling sub-circuit and a control sub-circuit, and the voltage control method comprising:
detecting, by a sampling sub-circuit, a potential difference between a voltage output terminal and a voltage input terminal to obtain a first voltage; and
comparing, by a control sub-circuit, the first voltage with a first voltage threshold;
performing, by the control sub-circuit, one of:
if the first voltage is less than the first voltage threshold, outputting a voltage received by the voltage input terminal to the voltage output terminal; and
if the first voltage is greater than or equal to the first voltage threshold, superimposing the voltage received by the voltage input terminal and a bootstrap voltage, and outputting the voltage as superimposed to the voltage output terminal, wherein the control sub-circuit comprises an amplification sub-circuit, a comparison sub-circuit, and an energy storage sub-circuit;
amplifying, by the amplification sub-circuit, the first voltage to obtain a second voltage;
performing, by the comparison sub-circuit, operations of: comparing the second voltage with a second voltage threshold, outputting a ground signal to the energy storage sub-circuit if the second voltage is less than the second voltage threshold, and outputting an input voltage signal to the energy storage sub-circuit if the second voltage is greater than or equal to the second voltage threshold; and
performing, by the energy storage sub-circuit, operations of: stepping down the input voltage to generate a bootstrap voltage, outputting the input voltage as the output voltage in an instance in which the ground signal outputted from the comparison sub-circuit is received, and superimposing and outputting the input voltage and the generated bootstrap voltage as the output voltage in an instance in which the input voltage signal outputted from the comparison sub-circuit is obtained.

9. A display device, comprising:
a voltage control circuit, the voltage control circuit comprising a sampling sub-circuit and a control sub-circuit, wherein:

the sampling sub-circuit is configured to detect a potential difference between an output voltage and an input voltage, obtain a first voltage, and output the first voltage to the control sub-circuit; and the control sub-circuit is configured to compare the first voltage with a first voltage threshold, if the first voltage is less than the first voltage threshold, output the input voltage as the output voltage, and, if the first voltage is greater than or equal to the first voltage threshold, superimpose the input voltage and a bootstrap voltage and output the input voltage and the bootstrap voltage as superimposed as the output voltage;

the control sub-circuit comprises an amplification sub-circuit, a comparison sub-circuit, and an energy storage sub-circuit;

the amplification sub-circuit is configured to amplify the first voltage to obtain a second voltage;

the comparison sub-circuit is configured to compare the second voltage with a second voltage threshold, output a ground signal to the energy storage sub-circuit if the second voltage is less than the second voltage threshold, and output an input voltage signal to the energy storage sub-circuit if the second voltage is greater than or equal to the second voltage threshold; and the energy storage sub-circuit is configured to step down the input voltage to generate a bootstrap voltage, output the input voltage as the output voltage in an instance in which the ground signal outputted from the comparison sub-circuit is received, and superimpose and output the input voltage and the generated bootstrap voltage as the output voltage in an instance in which the input voltage signal outputted from the comparison sub-circuit is obtained.

10. The display device according to claim 9, wherein the sampling sub-circuit comprises:
a first resistor and a first diode, wherein one terminal of the first resistor is connected to a voltage input terminal, another terminal of the first resistor is connected to an anode terminal of the first diode, and a cathode terminal of the first diode is connected to a voltage output terminal.

11. The display device according to claim 9, wherein the amplification sub-circuit comprises:
an operational amplifier, a second resistor, a third resistor, a fourth resistor, and a fifth resistor, wherein:
a non-inverting input terminal of the operational amplifier is grounded through the second resistor and is connected to the voltage input terminal through the third resistor;
an inverting input terminal of the operational amplifier is connected to the sampling sub-circuit through the fourth resistor and is connected to an output terminal of the operational amplifier through the fifth resistor;
a power supply positive electrode terminal of the operational amplifier is connected to a first reference voltage input terminal; and
a power supply negative electrode terminal of the operational amplifier is grounded.

12. The display device according to claim 9, wherein the comparison sub-circuit comprises:
a voltage comparator, a sixth resistor, a seventh resistor, an eighth resistor, a transistor, a second diode, and a relay, wherein:

a non-inverting input terminal of the voltage comparator is connected to an output terminal of the amplification sub-circuit;
an inverting input terminal of the voltage comparator is grounded through the sixth resistor and is connected to the first reference voltage input terminal through the seventh resistor;
an output terminal of the voltage comparator is connected to the first reference voltage input terminal through the eighth resistor;
a power supply positive electrode terminal of the voltage comparator is connected to the first reference voltage input terminal;
a power supply negative electrode terminal of the voltage comparator is grounded;
a control electrode of the transistor is connected to the output terminal of the voltage comparator;
a first electrode of the transistor is grounded;
a second electrode of the transistor is respectively connected to an anode of the second diode and one terminal of a coil of the relay;
a cathode of the second diode and another terminal of the coil of the relay are respectively connected to the first reference voltage input terminal;
a common contact of the relay is connected to the energy storage sub-circuit, a normally open contact of the relay is connected to the voltage input terminal; and
a normally closed contact of the relay is grounded.

13. The display device according to claim 9, wherein the energy storage sub-circuit comprises:
a buck chip, a first capacitor, a second electrolytic capacitor, a third electrolytic capacitor, a fourth capacitor, a fifth capacitor, a sixth capacitor, a third diode, a fourth diode, a fifth diode, and an inductor, wherein:
a power supply input terminal of the buck chip is connected to a voltage input terminal, and is connected to a ground terminal of the buck chip through the first capacitor, and the second electrolytic capacitor is connected in parallel at both terminals of the first capacitor;
the ground terminal and a switching terminal of the buck chip are grounded, an output terminal of the buck chip is respectively connected to a cathode terminal of the third diode and one terminal of the inductor, another terminal of the inductor is respectively connected to a feedback terminal of the buck chip;
a positive electrode of the third electrolytic capacitor, one terminal of the fourth capacitor, one terminal of the fifth capacitor and an anode terminal of the fourth diode, an anode terminal of the third diode, an anode of the third electrolytic capacitor, another terminal of the fourth capacitor, and another terminal of the fifth capacitor are all grounded; and
a cathode terminal of the fourth diode is connected to one terminal of the sixth capacitor and an anode terminal of the fifth diode, another terminal of the sixth capacitor is connected to the common contact of the relay, and a cathode terminal of the fifth diode is connected to an output terminal of the sampling sub-circuit and a voltage output terminal, respectively.

14. The display device according to claim 9, wherein:
the sampling sub-circuit comprises: a first resistor and a first diode;

the amplification sub-circuit comprises: an operational amplifier, a second resistor, a third resistor, a fourth resistor, and a fifth resistor;

the comparison sub-circuit comprises: a voltage comparator, a sixth resistor, a seventh resistor, an eighth resistor, a transistor, a second diode, and a relay;

the energy storage sub-circuit comprises: a buck chip, a first capacitor, a second electrolytic capacitor, a third electrolytic capacitor, a fourth capacitor, a fifth capacitor, a sixth capacitor, a third diode, a fourth diode, a fifth diode and an inductor, wherein:

one terminal of the first resistor is connected to a voltage input terminal, another terminal of the first resistor is connected to an anode terminal of the first diode, and a cathode terminal of the first diode is connected to a voltage output terminal;

a non-inverting input terminal of the operational amplifier is grounded through the second resistor and is connected to the voltage input terminal through the third resistor;

an inverting input terminal of the operational amplifier is connected to an output terminal of the operational amplifier through the fifth resistor and is connected to one terminal of the fourth resistor, another terminal of the fourth resistor is connected to another terminal of the first resistor and the anode terminal of the first diode, a power supply positive electrode terminal of the operational amplifier is connected to a first reference voltage input terminal, and a power supply negative electrode terminal of the operational amplifier is grounded;

a non-inverting input terminal of the voltage comparator is connected to an output terminal of the operational amplifier, an inverting input terminal of the voltage comparator is grounded through the sixth resistor and is connected to the first reference voltage input terminal through the seventh resistor, an output terminal of the voltage comparator is connected to the first reference voltage input terminal through the eighth resistor, a power supply positive electrode terminal of the voltage comparator is connected to the first reference voltage input terminal, and a power supply negative electrode terminal of the voltage comparator is grounded;

a control electrode of the transistor is connected to the output terminal of the voltage comparator, a first electrode of the transistor is grounded, a second electrode of the transistor is connected to an anode of the second diode and one terminal of a coil of the relay, a cathode of the second diode and another terminal of the coil of the relay are respectively connected to the first reference voltage input terminal, a common contact of the relay is connected to one terminal of the sixth capacitor, a normally open contact of the relay is connected to the voltage input terminal, and a normally closed contact of the relay is grounded;

a power supply input terminal of the buck chip is connected to the voltage input terminal and is connected to a ground terminal of the buck chip through the first capacitor, and the second electrolytic capacitor is connected in parallel at both terminals of the first capacitor;

the ground terminal and a switch terminal of the buck chip are both grounded, an output terminal of the buck chip is respectively connected to a cathode terminal of the third diode and one terminal of the inductor, another terminal of the inductor is respectively connected to a feedback terminal of the buck chip;

a positive electrode of the third electrolytic capacitor, one terminal of the fourth capacitor, one terminal of the fifth capacitor, and the fourth diode and an anode terminal connection, an anode terminal of the third diode, an anode of the third electrolytic capacitor, another terminal of the fourth capacitor, and another terminal of the fifth capacitor are all grounded;

a cathode terminal of the fourth diode is respectively connected to another terminal of the sixth capacitor and an anode terminal of the fifth diode; and a cathode terminal of the fifth diode is connected to a cathode terminal of the first diode and the voltage output terminal, respectively.

15. The display device according to claim 9, wherein the display device further comprises a level conversion circuit, and a voltage output terminal is connected to a gate-on voltage input terminal of the level conversion circuit.

16. The display device according to claim 15, wherein:

the display device further comprises a display panel, the display panel is a double cell display panel, the double cell display panel comprises a main display panel and a sub-display panel, the level conversion circuit comprises a main gate-on voltage input terminal for turning on a switching transistor of the main display panel and a sub-gate-on voltage input terminal for turning on a switching transistor of the sub-display panel, and the voltage output terminal is connected to the main gate-on voltage input terminal.

* * * * *